United States Patent Office 3,649,629
Patented Mar. 14, 1972

3,649,629
TRIAZAMETHYL HETEROCYCLIC
IMMUNOSUPPRESSIVES
William H. W. Lunn, Indianapolis, Ind., assignor to Eli
Lilly and Company, Indianapolis, Ind.
No Drawing. Filed May 11, 1970, Ser. No. 36,434
Int. Cl. C07d 57/12
U.S. Cl. 260—256.4 F
7 Claims

ABSTRACT OF THE DISCLOSURE

Pentacyclic 2,3 - dihydro-1H,8H-3a,7b,12b-triazabenz [c]acephenanthrylene-8-ones and hexacyclic 9H,14H-4b,9a,13b - triazadibenz[a,e]acephenanthrylene - 9,14-diones, prepared via sodium borohydride reduction of the ionic 2,3 - dihydro-8-oxo-1H,8H,3a,7b,12b-triazabenz[c] acephenanthrylen-12c-ylium halides and 9,14-dioxo-9H, 14H - 4b,9a,13b-triazadibenz[a,e]acephenanthrylen-14b-ylium halides respectively are useful agents for suppressing antibody formation.

SUMMARY

This invention relates to novel polycyclic triaza compounds. In particular it relates to triazabenz[c]acephenanthrylene and triazadibenz[a,e]acephenanthrylene polycyclic compounds possesing a unique ring system comprising the triazamethyl moiety.

The compounds of the present invention are represented by the following general Formula I

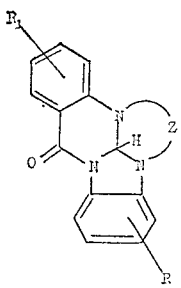

wherein R and $R_1$ are hydrogen, methyl or chloro,

Z is 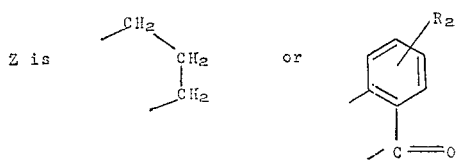

and $R_2$ is hydrogen, methyl or chloro.

The triaza polycyclic compounds represented by the structural Formula I are prepared by the sodium borohydride reduction of a benzimidazoquinazolinium compound represented by the Formula II.

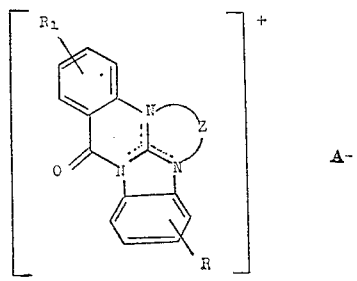

wherein R, $R_1$ and Z have the same meanings as previously defined and $A^-$ is chloride, bromide or iodide.

The compounds of the Formula II, which are novel intermediates in the synthesis of the triazamethyl polycyclic compounds of the Formula I, are prepared according to the following synthetic procedure. A 2-chlorobenzimidazole is reacted with an anthranilic acid or an ester thereof to obtain a benzimidazo[2,1-b]quinazolin-12(6H)one of the formula.

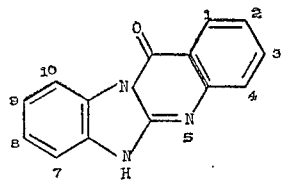

The sodium salt of the benzimidazo[2,1-b]quinazolinone is then alkylated with a 3-halopropyl p-toluenesulfonate to obtain a 6-(3-halopropyl)benzimidazo[2,1-b]quinazolinone. The alkylation product is then heated in refluxing digylme to obtain the ionic quinazolinium compound of the Formula II wherein Z is —CH₂—CH₂—CH₂—, R and $R_1$ are both hydrogen, and A is chloride.

When the sodio derivative of a benzimidazo[2,1-b]quinazolinone is reacted with an o-haloaroyl halide, such as o-chlorobenzoyl chloride, a 6-(2-halobenzoyl)benzimidazo [2,1-b]quinazolin-12(6H)-one is obtained. Pyrolysis of the 6-(2-halobenzoyl)-derivative yields the ionic quinazolinium halide of the Formula II wherein R and $R_1$ are both hydrogen, Z is 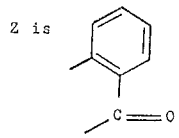

and A is chloride.

In a similar manner, by employing a substituted benzimidazo[2,1-b]quinazolinone, the desired compound of Formula II can be obtained wherein the substituent groups R, $R_1$ and $R_2$ are other than hydrogen.

The novel triazadibenz[a,e]acephenanthrylene and triazabenz[c]acephenanthrylene compounds of this invention possess immunosuppressant activity.

DETAILED DESCRIPTION

The novel triazabenz[c]- and triazadibenz[a,e]acephenanthrylene compounds represented by Formula I are crystalline substances of low solubility in many of the common organic solvents. They are somewhat soluble in dimethylformamide and diglyme.

As previously mentioned they are prepared by the reduction of an ionic quinazolinium halide of the Formula II with an alkali metal borohydride in aqueous methanol. Sodium borohydride is the preferred alkali metal borohydride. The reduction is carried out at a temperature between about 0° C. and 30° C. The reaction is exothermic and periodic cooling by means of an ice bath is necessary to maintain the desired temperature. The reaction mixture is stirred at the above temperature for about one hour and is then cooled in an ice bath to about 0–5° C. The pH of the reaction mixture is adjusted to about pH 1.5 by the addition of dilute acid, suitably 10 percent aqueous hydrochloric acid, to effect hydrolysis of the reduction product-borohydride adduct. Following hydrolysis under acidic conditions, the hydrolyzed reaction mixture is basified by the addition of base, conveniently, a one percent aqueous solution of sodium carbonate. The reduction product is isolated by filtration and can be purified by recrystallization from hot aqueous dimethylformamide. The borohydride reduction converts the ionic quinazolinium compound of the Formula II to the triazamethyl compound of Formula I as illustrated by the following simplified scheme.

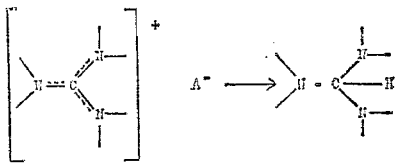

The penta- and hexacyclic benzimidazoquinazolinium halides of the Formula II are prepared from the tetracyclic benzimidazo[2,1-b]quinazolin-12(6H)ones in the following manner.

A 2-chlorobenzimidazole is reacted with an anthranilic acid or an ester thereof by fusing a mixture of the two reactants to obtain a benzimidazo[2,1-b]quinazolin-12(6H)-one, according to the following reaction scheme:

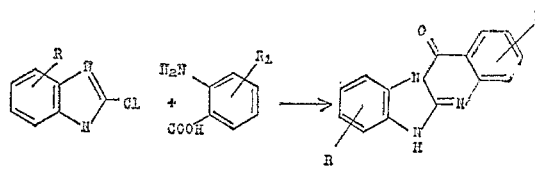

wherein R and $R_1$ have the same meaning as previously defined. The benzimidazoquinazolone is reacted with a 3-halopropyl p-toluenesulfonate to provide a 6-(3-halopropyl)benzimidazo[2,1 - b]quinazolin - 12(6H)one. The alkylation is carried out by first preparing the sodium derivative of the benzimidazoquinazolone with sodium hydride in dimethylformamide. The dimethylformamide solution of the sodium salt is then added to a stirred solution of the 3-halopropyl p-toluenesulfonate in dimethylformamide and the reaction is allowed to stir for about 3 days at ambient temperature. The reaction mixture is poured into ice-water, whereupon the product precipitates. The product is filtered and dried to yield the 6-(3-halopropyl)benzimidazo[2,1 - b]quinazolin - 12(6H)one. 3-halopropyl p-toluenesulfonates such as 3-chloropropyl p-toluenesulfonate, 3-bromopropyl p-toluenesulfonate and 3-iodopropyl p-toluenesulfonate are all suitable alkylating agents, although the preferred 3-halopropyl sulfonate is 3-chloropropyl p-toluenesulfonate.

The 6-(3-halopropyl)benzimidazo[2,1-b]quinazolin-12(6H)one is then heated in refluxing diglyme to yield a pentacyclic benzimidazoquinazolinium halide of the Formula II, wherein Z is —$CH_2$—$CH_2$—$CH_2$—, and R and $R_1$ are as previously defined. The cyclization reaction is carried out at the reflux temperature of diglyme over a reaction period of about 30 minutes. As the reaction progresses, the benzimidazoquinazolinium halide product precipitates from the hot reaction mixture. The reaction mixture is cooled and the product is filtered and washed with cold diglyme. The benzimadoquinazolinium halide can be further purified by recrystallization from methanol-isopropanol.

When the sodium salt of the benzimidazo[2,1-b]quinazolone is reacted with an o-haloaroyl halide, a 6-(o-haloaroyl)benzimidazo[2,1 - b]quinazolin - 12(6H)one is obtained. Pyrolysis of this product forms the hexacyclic benzimidazoquinazolinium halide of the Formula II wherein Z is

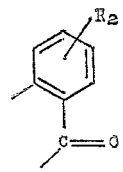

The pyrolysis reaction results in a novel ring closure involving the displacement of the o-halo substituent of the 6-(o-haloaroyl) moiety by the nitrogen in the 5-position of the benzimidazoquinazolinone.

The reaction of the sodium salt of the desired benzimidazo[2,1-b]quinazolin-12(6H) one with the o-haloaroyl halide is carried out by the addition of the halide to a solution of the sodium salt in dimethylformamide. The reaction mixture is stirred at ambient temperature for about 2 to 4 hours and is then poured into ice water to precipitate the product. o-Haloaroyl halides such as 2-chlorobenzoyl chloride, 2-chloro-4-methylbenzoyl chloride, 2,4-dichlorobenzoyl chloride, 2,3-dichlorobenzoyl chloride, 2-chlorobenzoyl bromide, 2-bromobenzoyl bromide and the like can be employed in the present invention.

Among the benzimidazoquinazolinium halides of the Formula II provided by this invention are included the following:

2,3-dihydro-8-oxo-1H,8H-3a,7b,12b-triazabenz[c]
   acephenanthrylen-12c-ylimino chloride
6-chloro-9,14-dioxo-9H,14H-4b,9a,13b-triazadibenz[a,e]
   acephenanthrylen-14b-ylium chloride
9,14-dioxo-9H,14H-4b,9a,13b-triazadibenz[a,e]
   acephenanthrylen-14b-ylium chloride.

Illustrative of the triazobenz[c]acephenanthrylene and triazadibenz[a,e,]acephenanthrylene compounds of the Formula I, provided by this invention are the following:

2,3-dihydro-1H,8H-3a,7b,12b-triazobenz[c]
   acephananthrylen-8-one,
6-chloro-9H,14H-4b,9a,13b-triazobenz[a,e]
   acephenanthrylen-9,14-dione,
6-methyl-9H,14H-4b,9a,13b-triazodibenz[a,e]
   acephenanthrylene-9,14-dione,
5-methyl-9H,14H-4b,9a,13b-triazodibenz[a,e]
   acephenanthrylen-9-,14-dione,
3,6-dichloro-9H,14H-4b,9a,13b-triazodibenz[a,e]
   acephananthrylen-9,14-dione,
11-chloro-9H,14H-4b,9a,13b-triazodibenz[a,e]
   acephenanthrylen-9,14-dione,
3-methyl-6-chloro-9H,14H-4b,9a,13b-triazodibenz[a,e]
   acephenanthrylene-9,14-dione,
3-methyl-6-chloro-9H,14H-4b,9a,13b-triazodibenz[a,e]
   acephenanthrylen-9,14-dione,
5-chloro-2,3-dihydro-1H,8H-3a,7b,12b-triazobenz[c]
   acephananthrylen-8-one,
11-chloro-2,3-dihydro-1H,8H-3a,7b,12b-triazobenz[c]
   acephenanthrylen-8-one, and
11-methyl-2,3-dihydro-1H,8H-3a,7b,12b-triazobenz[c]
   acephenanthrylen-8-one.

The novel triazomethyl compounds of this invention represented by the Formula I are active in suppressing the immune response reaction in animals as demonstrated by their ability to suppress antibody formation in mice.

The compounds can be classed as "immunosuppressant agents," by which is meant agents which suppress the formation of antibodies to foreign substances. They can therefore be used in suppressing the immune response mechanism in warm blooded mammals, as for example, to inhibit the rejection of a newly acquired organ or skin graft by the host following an organ transplant or skin graft operation. The activity of the compounds of this invention can also be characterized as anti-allergic activity in that the allergic reaction is part of the immune reaction against foreign antigens.

The ability of the compounds of this invention to suppress the immune reaction in a host animal was measured by their activity as anti-allergic agents in the following described test. The test procedure is essentially that described by H. C. Nathan et al., Proc. Soc. Exptl. Biol. Med. 107, 796 (1961).

Groups of five 20 g. male Swiss mice are injected intraperitoneally with 0.2 ml. of a 1–80 suspension of washed sheep red blood cells (approximately $5 \times 10^7$ cells/mouse). Forty-eight hours before and 48 hours after the red blood cell injections, the test compounds are administered intraperitoneally in various dosages to various animal groups. Seven days after the red blood cell antigen injections,

I claim:
1. The compound of the formula

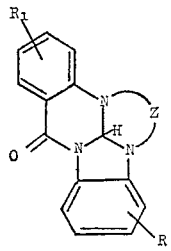

wherein R and $R_1$ are hydrogen, methyl or chloro,

Z is 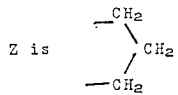 or 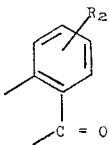

and $R_2$ is hydrogen methyl or chloro.

2. The compound of claim 1, said compound being 2,3-dihydro - 1H,8H - 3a,7b,12b - triazabenz[c]acephenanthrylen-8-one.

3. The compound of claim 1 said compound being 6-chloro - 9H,14H - 4b,9a,13b-triazadibenz[a,e]acephenanthrylen-9,14-dione.

4. The compound of claim 1 said compound being 9H, 14H - 4b,9a,13 - triazadibenz[a,e]acephenanthrylen-9,14-dione.

5. The compound of the formula

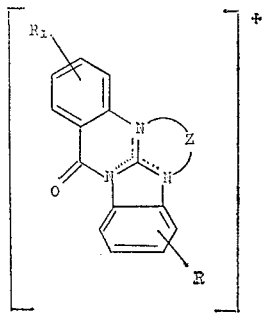

wherein R and $R_1$ are hydrogen, methyl or chloro,

Z is 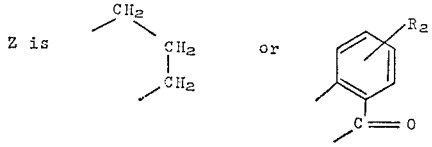

and $R_2$ is hydrogen, methyl or chloro and $A^-$ is chloride, bromide or iodide.

6. The compound of claim 5 said compound being 2,3-dihydro-8-oxo-1H,8H - 3a,7b,12b - triazabenz[c]acephenanthrylen-12c-ylium chloride.

7. The compound of claim 5 said compound being 6-chloro-9,14-dioxo - 9H,14H - 4b,9a,13b-triazadibenz[a,e] acephenanthrylen-14b-ylium chloride.

No references cited.

ALEX MAZEL, Primary Examiner

R. J. GALLAGHER, Assistant Examiner

U.S. Cl. X.R.

424—251